US 6,740,349 B2

(12) United States Patent
Franklin et al.

(10) Patent No.: US 6,740,349 B2
(45) Date of Patent: May 25, 2004

(54) APPARATUS AND METHOD FOR FORMING CASINGLESS SAUSAGES

(75) Inventors: Rodney L. Franklin, Keokuk, IA (US); Marvin J. Mentjes, Fort Madison, IA (US); Richard A. Mueller, West Point, IA (US); Charles A. Triplett, Surprise, AZ (US); Andrew C. Harvey, Waltham, MA (US)

(73) Assignee: The Dial Corporation, Scottsdale, AZ (US)

( * ) Notice: Subject to any disclaimer, the term of this patent is extended or adjusted under 35 U.S.C. 154(b) by 0 days.

(21) Appl. No.: 10/158,578

(22) Filed: May 30, 2002

(65) Prior Publication Data

US 2002/0197368 A1 Dec. 26, 2002

Related U.S. Application Data

(63) Continuation-in-part of application No. 09/690,358, filed on Oct. 17, 2000, now Pat. No. 6,444,248.
(60) Provisional application No. 60/160,237, filed on Oct. 18, 1999.

(51) Int. Cl.$^7$ ............................... A22C 7/00; A23B 4/00
(52) U.S. Cl. ........................... 426/513; 99/353; 99/494; 99/516; 426/277; 452/37
(58) Field of Search ......................... 426/513, 92, 277, 426/646; 452/37, 30; 99/483, 353, 494, 516; 141/1

(56) References Cited

U.S. PATENT DOCUMENTS

| 3,589,407 | A | * | 6/1971 | Foldenauer | 141/1 |
| 3,885,053 | A | | 5/1975 | Townsend | 426/276 |
| 4,294,858 | A | | 10/1981 | Moule | 426/513 |
| 5,056,425 | A | | 10/1991 | Mally | 99/494 |
| 5,118,519 | A | | 6/1992 | Mally et al. | 426/513 |
| 5,236,731 | A | | 8/1993 | Becker | 426/513 |

* cited by examiner

Primary Examiner—George C. Yeung
(74) Attorney, Agent, or Firm—Linda M. Buckley; Steven M. Jensen; Edwards & Angell, LLP

(57) ABSTRACT

An apparatus and method is provided for forming shaped food products from an emulsion or batter. A stuffing tube includes a wall defining a central passage for emulsion, and a treating fluid passage positioned within the wall and radially outside of the central passage. The stuffing tube is slideably mounted coaxially within a mold tube. Emulsion and treating fluid are deposited into the mold tube during retraction of the stuffing tube from the mold tube, where the depositions occur substantially without relative motion between the emulsion and the treating fluid, or between the emulsion/treating fluid and the inside of the mold tube. A production machine incorporating an array of stuffing tubes can be indexed with a plurality of arrays of mold tubes.

57 Claims, 3 Drawing Sheets

APPARATUS AND METHOD FOR FORMING CASINGLESS SAUSAGES

CROSS-REFERENCE TO RELATED APPLICATION(S)

This application is a continuation-in-part of application(s) application No. 09/690,358, filed Oct. 17, 2000, now U.S. Pat. No. 6,444,248, which claims priority to U.S. Provisional Application Serial No. 60/160,237 filed on Oct. 18, 1999 in the U.S. Patent & Trademark Office.

FIELD OF INVENTION

The present invention is directed to an apparatus and method for forming a proteinaceous emulsion or batter into shaped food products such as sausages, and more particularly to a method of stuffing and an apparatus including a stuffing tube slideably received in a mold tube.

BACKGROUND OF THE INVENTION

Sausages and other formed meat products such as bologna, Vienna sausages, and the like typically are made by extruding a proteinaceous meat emulsion or batter into an artificial casing of a desired size and shape, and then cooking the batter within the casing. After cooking, the casing is peeled from the meat product and discarded. Once the casing has been removed, the shaped meat product can be cut into predetermined lengths and placed in suitable containers for distribution to consumers.

Various devices and methods for making casingless sausages have been proposed in order to form and process sausages and the like without the use of casings, which are undesirable because of added costs resulting from the requirements of providing casings and thereafter disposing of the used casings. Examples are U.S. Pat. Nos. 5,056,425 and 5,118,519 to Mally. The Mally patents disclose an apparatus which ejects partially shaped products onto a conveyor assembly. According to Mally, batter is pumped into a molding tube, and a treating assembly is formed as a continuation of the molding tube. The treating assembly functions to introduce treating fluid, typically a food grade acid solution, which causes a proteinaceous skin to form about the batter. A piston or ram mechanism causes the batter with proteinaceous skin to be deposited onto a conveyor belt. The conveyor belt then continues into a cooking apparatus. Once cooked, the product is canned.

U.S. Pat. No. 3,885,053 to Townshend discloses a process of forming a skin on an extruded meat emulsion by applying an acid to the surface of the emulsion as the extrusion proceeds. Acid is pumped from an outside source into a conduit into which emulsion is extruded, where acid treatment, emulsion flow, and subsequent treatments all occur in a single conduit. Accordingly, while the device in Townshend can be used in a stand-alone procedure, it is not suitable for a high output production process.

U.S. Ser. No. 09/690,358 (hereinafter "'358 application"), filed on Oct. 17, 2000, and with a corresponding PCT application being published under Publication No. WO 01/30164, is directed to an apparatus and method for forming casingless sausages. The '358 application and its PCT application are commonly owned with the present invention. The '358 application describes a molding tube that is slideably mounted about a stuffing tube, the stuffing tube comprising concentric inner and outer tubes. Emulsion is pumped through the inner tube of the stuffing tube and forced against the closed end of the molding tube, causing the molding tube to move relative the stuffing tube. The '358 application describes a stuffing tube with both inner and outer tubes, where the treating fluid flows in an annular passage between these tubes and is then released into the molding tube.

According to the '358 application, the treating fluid deposition should be continuous so as to evenly coat the inside of the molding tube, thereby forming a proteinaceous skin about the surface of the emulsion. However, the '358 application does not address controlling the relative amounts of emulsion and treating fluid which flow into the molding tube.

It would be desirable to provide an apparatus and method for forming a casingless food product of the type having telescoped stuffing and mold tubes, wherein a single stuffing tube is capable of making simultaneous depositions of emulsion and treating fluid, wherein the relative amounts of emulsion and treating fluid which flow into the mold tube are controlled and there is substantially no relative motion between the emulsion and treating fluid.

SUMMARY OF THE INVENTION

The present invention relates to an apparatus and methods for forming a proteinaceous emulsion or batter into shaped food products such as sausages without the use of a casing. In one exemplary embodiment, a supply of suitable proteinaceous emulsion is provided, and the emulsion is conveyed under pressure through an elongated hollow stuffing tube into a mold tube, where the stuffing tube is slideably mounted co-axially within the mold tube, and treating fluid is conducted through a conduit formed in the stuffing tube wall. According to one method of the present invention, the stuffing tube is fully inserted into the mold tube and then retracted as emulsion exits the stuffing tube. Preferably, the mold tube and stuffing tube move axially apart at such a rate that the emulsion substantially fills the mold tube but essentially does not slide on the walls of the mold tube.

As the emulsion exits the stuffing tube and enters the mold tube, the treating fluid forms a skin over the surface of the emulsion, such that the treating fluid evenly coats the emulsion being deposited in the mold tube. The treating fluid is directed to the interior surface of the mold tube in such a manner that the interior surface of the mold tube is continuously wetted by the treating fluid, as the mold tube moves relative to the stuffing tube. Depositions of emulsion and treating fluid occur substantially without relative motion between the emulsion and the treating fluid, or between the emulsion/treating fluid and the interior surface of the mold tube. This ensures that the entire outer surface of the molded emulsion is contacted by the treating fluid, thereby forming a coagulated proteinaceous skin on the molded emulsion and, hence, preventing the emulsion from adhering to the interior surface of the mold tube to any significant degree.

Preferred treating fluids include diluted food grade acids, including but not limited to the following: acetic acid, ascorbic acid, citric acid, fumaric acid, malic acid, hydrocholoric acid, and phosphoric acid. Any suitable acidic material having some lubricating properties and being capable of reacting with the proteinaceous skin on the molded emulsion to form a coagulated, cohesive skin surface is suitable. Both organic and inorganic acid materials can be used as the treating fluid.

Preferably there is provided a smooth, steady deposition of emulsion from the stuffing tube that is received within a thin coating of treating fluid on the mold tube surface, the emulsion deposition occurring substantially without folds, ripples, or sticking spots on the emulsion product. The present invention provides that depositions of treating fluid and emulsion occur substantially without relative motion between the treating fluid and emulsion, meaning that the emulsion does not slide on the mold tube wall to any significant degree, the mold tube remains free and clear of emulsion residue, and product having the desired surface characteristics can be easily ejected from the mold tube after subsequent thermal treatment.

After the mold tube is filled with emulsion and the stuffing tube is fully retracted, the mold tube is separated from the stuffing tube. The mold tube with molded emulsion product inside is then subjected to a heat treatment to cook the emulsion. A length of formed product (e.g. sausage) can be removed from the mold tube for further processing. The product can be formed to any desired length or shape, subject only to limitations in the type of equipment used. Times for heat treating different types of molded emulsion product are well known to those of ordinary skill in the food processing arts.

Preferably, there is an approximately constant ratio of treating fluid to emulsion in the mold tube. Typically, the amount of treating fluid is quite small compared to the amount of emulsion, and preferably the ratio thereof is set at a predetermined level. The relative axial velocities of the stuffing and mold tube can be set, i.e., a retraction rate of the stuffing tube from the mold tube can be fixed at a desired level. The volume flows of the emulsion and treating fluid must be closely regulated and synchronized with the relative axial motion between the stuffing tube and mold tube to assure that the treating fluid evenly coats the emulsion resident in the mold tube as the stuffing tube withdraws. Mechanisms and methods for determining and controlling relative velocities are well known in the art.

The time required to fill the mold tube is relatively short compared to the time for thermal treatment. Therefore, a single stuffing tube can be operated in conjunction with a much larger number of mold tubes. For example, a rotary arrangement can be provided with multiple sets of mold tubes for every one set of stuffing tubes. After a stuffing operation, the mold tubes preferably are held in heat treatment for a predetermined interval. The mold tubes and stuffing tubes can be arranged in a sequential, repetitive production process.

Based on the above-described methods, various mechanical configurations can be designed either to produce single pieces of product, such as sausage, on demand, or to produce a high rate of continuous product, e.g., by using automated equipment.

The herein described invention is directed to an apparatus for forming a casingless food product including a stuffing tube extending between an input end and a discharge end, the stuffing tube having a wall defining a central emulsion passage, a treating fluid passage positioned within the wall of the stuffing tube and radially outside of the central emulsion passage, and further including a mold tube for receiving the stuffing tube, the stuffing tube being slideable axially along the mold tube, wherein depositions of emulsion and treating fluid are made from the discharge end of the stuffing tube into the mold tube. Preferably, such depositions occur substantially without relative motion between the emulsion and the treating fluid.

A method according to the present invention is characterized by providing emulsion and treating fluid conveyed through a stuffing tube, the stuffing tube having a wall defining a central emulsion passage, and a treating fluid passage positioned within the wall and radially outside of the central emulsion passage; receiving the stuffing tube in a mold tube, the stuffing tube being slideable along the mold tube; depositing the emulsion from the central emulsion passage into the mold tube through a discharge end of the stuffing tube; and depositing the treating fluid from the treating fluid passage into the mold tube through the discharge end of the stuffing tube. Preferably the depositing steps occur substantially without relative motion between the emulsion and the treating fluid.

Additional optionally present parameters of the invention include providing a sliding seal positioned around the periphery of the stuffing tube, wherein the sliding seal can be an elastomer or a polymer. The mold tube preferably includes an output end having a valve member rotatable between an open and a closed position, wherein in the open position the valve member permits the food product to exit the mold tube, and in the closed position the valve member blocks the output end of the mold tube. Preferably the valve member forms a seal with the mold tube and is made of a polymer. The valve member also can include a valve support to counterbalance a pressure force in the mold tube, wherein the valve support can include a chamber within the valve support for receiving fluid to pressurize the valve support.

Further optional parameters of the invention include a central emulsion passage which is narrowed in a region for receiving the sliding seal. The central emulsion passage also can include a region of expanding surface area near its discharge end.

Preferably the treating fluid passage includes a conduit positioned within the wall of the stuffing tube that runs generally parallel to the central emulsion passage. The treating fluid passage also can include a circumferential groove for distributing the treating fluid through the discharge end of the stuffing tube. A guide ring can be positioned circumferentially around the stuffing tube in order to maintain a clearance between the stuffing tube and the mold tube. The guide ring can contain a plurality of grooves to distribute the treating fluid into the mold tube.

The apparatus can further include an emulsion pump for pumping emulsion from a delivery vessel to the stuffing tube, and a treating fluid pump for pumping treating fluid into the stuffing tube. A jacket can be provided to surround the mold tube for circulating hot or cold fluid. Preferably both the stuffing tube and the mold tube are made of stainless steel or a similar material of sufficient strength and wearability.

A production machine incorporating one or more of the above features can include an array of stuffing tubes and an array of mold tubes, where the mold tubes can be positioned in rows on a rotary wheel.

Further aspects of an exemplary method according to the present invention include a step of inserting the stuffing tube into the mold tube prior to depositing the emulsion and treating fluid. The stuffing tube preferably is retracted from the mold tube during the depositing steps. Accordingly, flow rates of emulsion and treating fluid are controlled, and can be provided in a fixed ratio. Further, the rate of retraction of the stuffing tube can be controlled, and can be linked in a constant ratio with the treating fluid flow rate. Additional steps of the method include heat treating the emulsion and treating fluid in the mold tube, and then opening an exit valve after heat treating to release the molded food product.

Other aspects and examples of the invention are more fully discussed below.

BRIEF DESCRIPTION OF THE DRAWING

For a fuller understanding of the nature and desired objects of the present invention, reference is made to the following detailed description taken in conjunction with the accompanying drawing figures wherein like reference characters denote corresponding parts throughout the several views and wherein.

DETAILED DESCRIPTION OF THE INVENTION

Figure 1:
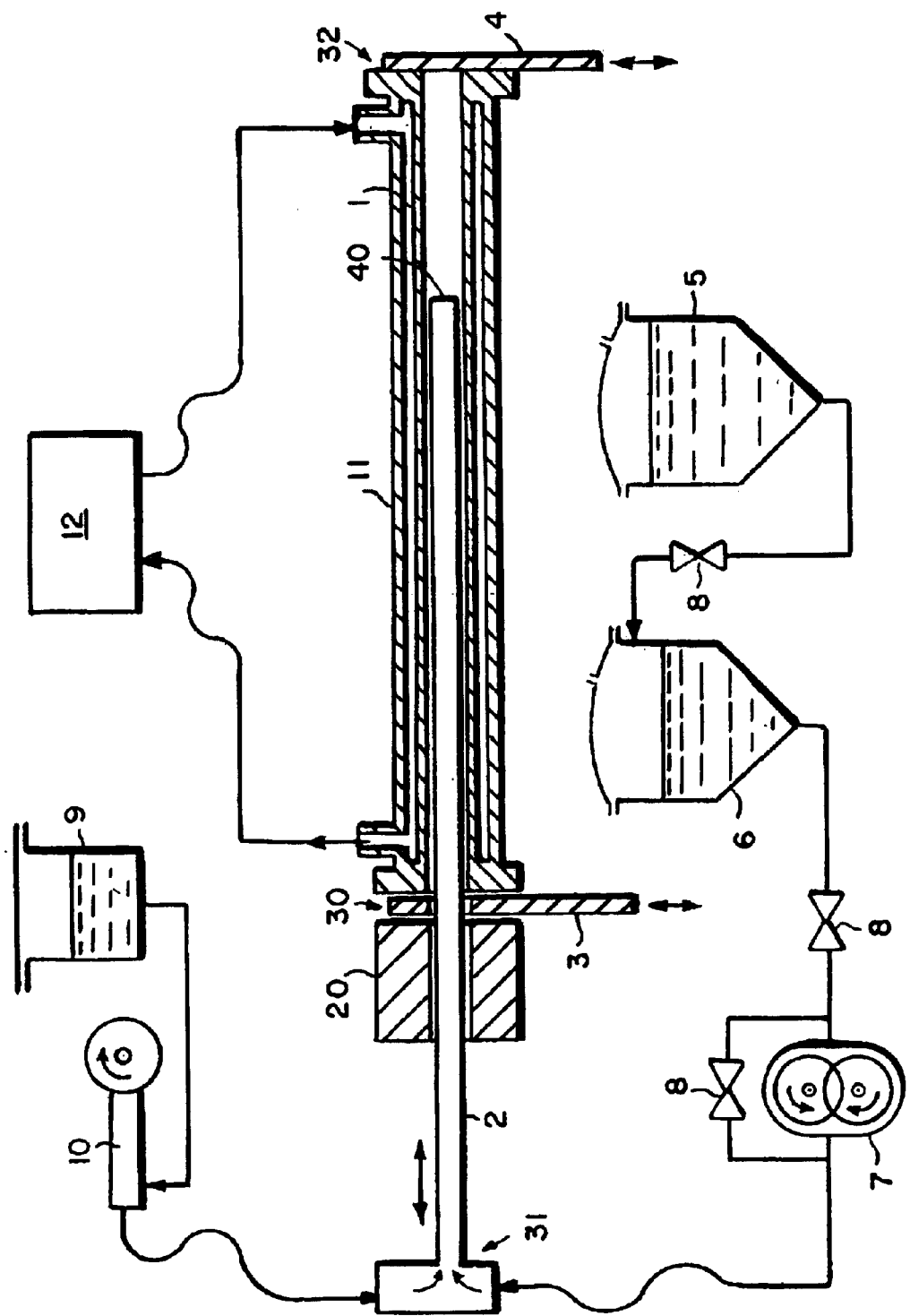
FIG. 1 is a schematic view of an apparatus for forming casingless food products, according to the present invention.

Although the apparatus and methods for forming casingless food products are primarily illustrated with reference to sausages and other casingless food products, it will be appreciated by those skilled in the art that other devices and apparatuses can also be used to form casingless products in accordance with the spirit and teachings of the present invention. It will also be appreciated by the skilled artisan that the invention is not limited in its application to the details of the construction and arrangement of components set forth in the following description or illustrated in the drawings. The apparatus of the present invention includes other embodiments and the methods of the present invention can be practiced or carried out in various ways.

In accordance with the present invention, emulsion can be pumped into a stuffing tube, which is telescoped in a mold tube. The emulsion flows through a central emulsion passage and is controllably released into the mold tube. Simultaneously, treating fluid is pumped into a treating fluid passage in the stuffing tube. Preferably, the stuffing tube is fully inserted into the mold tube, and then the emulsion and treating fluid are released during retraction of the stuffing tube from the mold tube. Depositions of the emulsion and treating fluid can occur substantially without relative motion between the emulsion and treating fluid. An exemplary stuffing method can involve linking the stuffing tube retraction rate and the treating fluid flow rate in a constant ratio, and thereby controlling the emulsion flow rate to provide a steady deposition of emulsion in the mold tube that is received within a thin coating of treating fluid, which results in an emulsion deposition substantially without folds, ripples, or sticking spots on the molded emulsion product.

FIG. 1 is a schematic view of a system for making products such as casingless sausages according to the present invention. An apparatus for forming casingless sausages includes a mold tube 1 and a stuffing tube 2 that is mounted to move axially along the length of the mold tube between a first, docking position at an input end 30 of the mold tube 1 and a second, fully inserted position at an output end 32 of the mold tube 1. The stuffing tube 2 includes an input end 31 for receiving a charge of emulsion or batter and a discharge end 40, shown in greater detail in FIG. 2.

An input valve member or plate 3 is provided at the input end 30 of the mold tube 1. The input plate 3 preferably is moveable from an open position, as depicted in FIG. 1, to a closed position in which the plate 3 blocks entry into the stuffing tube 2.

Figure 2:
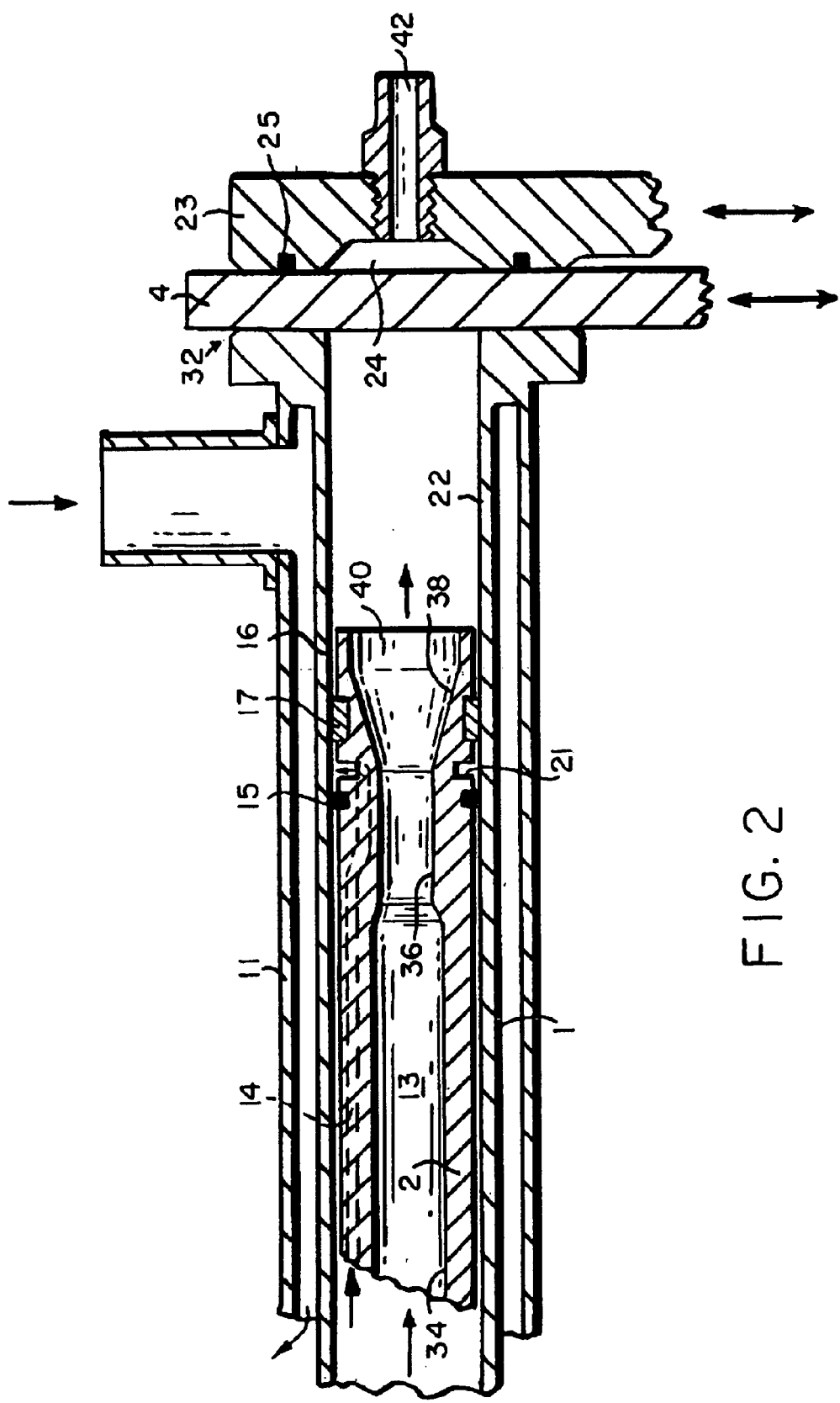
FIG. 2 is a partial sectional view of a stuffing tube and a mold tube showing the stuffing tube slideably mounted within the mold tube.

An output valve member or plate 4 is provided at the output end 32 of the mold tube 1, the output plate being movable between an open position and a closed position. When opened, the output plate 4 permits a molded emulsion product to exit the mold tube 1. In the closed position, as depicted in FIG. 2, the output plate 4 receives molded product from the stuffing tube 2 and blocks the output end 32 of the mold tube 1.

FIG. 1 also depicts an emulsion supply system flexibly connected to the stuffing tube for pumping emulsion or batter into the stuffing tube 2. The emulsion supply system includes a storage vessel 5 having a volume preferably containing emulsion or batter, any remaining volume therein being filled with air. A delivery vessel 6 can receive emulsion from the storage vessel 5, where any remaining volume in the delivery vessel preferably is filled with air or is a vacuum. An emulsion pump 7 is provided for regulating the amount of emulsion to be pumped into the stuffing tube 2, in a manner to be discussed further below. The emulsion pump 7 is preferably of the rotary positive-displacement type, such as gear, lobe, and sliding vane types commonly used in the food packaging industry. Typical food-grade flexible hose can be used to connect the pump to the stuffing tube 2. Additionally, one or more isolation valves 8 are positioned at various locations along the emulsion supply path, including between the storage vessel 5 and the delivery vessel 6, between the delivery vessel 6 and the emulsion pump 7, and along a path bypassing the emulsion pump 7. Operation of the isolation valves is discussed in more detail herein.

A treating fluid supply system is flexibly connected with the stuffing tube 2 for pumping treating fluid into the stuffing tube. A treating fluid tank 9 containing a supply of treating fluid is connected to a metering pump 10, which regulates pumping of the treating fluid.

A heat treatment system is provided for heating the emulsion in the mold tube 1, the mold tube being surrounded by a jacket 11 for circulating a heat transfer fluid. Flow of heating fluid is governed by a circulation system 12 including, e.g., a pump and various flexible hoses or tubes, or any other arrangement commonly used for heat treatment of an emulsion or batter. The circulation system 12 can be used to circulate hot or cold fluid as desired.

FIG. 2 depicts an exemplary arrangement of the mold tube 1 relative to the stuffing tube 2. As shown in FIG. 2, the stuffing tube 2 is at an intermediate position in the mold tube 1. The stuffing tube 2 preferably includes a wall defining a central emulsion passage 13 and a smaller treating fluid passage 14 formed within the wall and running generally parallel to the central emulsion passage 13. The central emulsion passage 13 includes a first region 34 having a relatively large diameter, which narrows in a second region 36, thereafter expanding in a third region 38 near the outlet of the stuffing tube. The second region 36 is generally narrower than the first region 34 in order to accommodate a sliding seal 15 preferably positioned around the periphery of the stuffing tube. The sliding seal 15 can be made of an elastomer or a polymer, as discussed below, and allows the stuffing tube to controllably slide along the mold tube.

The central emulsion passage 13 and treating fluid passage 14 are designed to carefully regulate the flows of emulsion and treating fluid from the stuffing tube 2 into the mold tube 1. The output valve member 4 remains closed during a stuffing process, i.e. while emulsion and treating fluid are transferred from the stuffing tube 2 to the mold tube 1. The flow area of the central emulsion passage 13 preferably is maximized in the first region 34, for a given diameter of product, so that flow shear stress is minimized. The smaller treating fluid passage 14 can be a conduit positioned anywhere within the wall of the stuffing tube 2 outside of the central emulsion passage 13. By positioning the treating fluid passage/conduit 14 outside of the central emulsion passage 13, the central emulsion passage 13 can remain relatively unobstructed for cleaning. The conduit 14 can be constructed by forming a groove in the wall of the stuffing tube 2 and inserting in the groove a small tube, e.g. hypodermic needle stock, and then either brazing the small tube in place or else brazing a cover strip over the groove.

As shown in FIG. 2, the treating fluid passage 14 is positioned in the stuffing tube wall parallel to the first region 34 of the central emulsion passage 13, and generally follows the contour of the emulsion passage 13 in the second region 36, passing inside the sliding seal 15. In the vicinity of the third region 38 of the emulsion passage, the treating fluid passage 14 exits the stuffing tube wall and connects with a circumferential groove 21 that distributes treating fluid uniformly around the circumference of a discharge end 40 of the stuffing tube 2. As a result of this particular configuration of the treating fluid conduit 14 and groove 21, during system startup, the flow of treating fluid will tend to purge any air bubbles out of the conduit 14, and the conduit will remain filled with treating fluid even during vertical operation, due to capillary forces at the end of the conduit adjacent the circumferential groove 21.

Preferably the stuffing tube 2 is provided with sufficient clearance within the mold tube 1 to prevent unwanted friction between the stuffing tube and the mold tube, and so that any abrasion does not mar an internal surface finish 22 of the mold tube 1. The surface finish 22 can be electropolished or plated if desired. A minimum clearance preferably is maintained adjacent the discharge end 40 of the stuffing tube 2, in order to produce an even distribution of treating fluid around an annulus 16. A close and uniform clearance can be maintained by use of an optional rider or guide ring 17, which can be installed near the discharge end 40 of the stuffing tube 2. The guide ring 17 can extend around the circumference of the stuffing tube 2 and is preferably split at one point to allow installation. The guide ring 17 can be made of a generally hard material such as a polymeric composite to reduce friction with the internal surface finish 22 of the mold tube 1, the guide ring being grooved axially to distribute treating fluid. Alternatively, the guide ring 17 can be made of a softer, micro-porous polymer, e.g. TEFLON, which permits treating fluid to permeate the guide ring, in order to wet the mold tube wall. The guide ring is an optional part which can be omitted without departing from the spirit or scope of the present invention.

The stuffing tube 2 extends axially beyond the guide ring 17, where the passage 13 preferably assumes the shape of a funnel, so that emulsion flow can diverge smoothly and exit in the same region where the treating fluid exits the conduit 14 and the annulus 16. Accordingly, there is provided a smooth, steady deposition of emulsion in the mold tube 1 that is received within a thin coating of treating fluid on the mold tube surface, the emulsion deposition occurring substantially without folds, ripples, or sticking spots on the emulsion product. The present invention provides that depositions of treating fluid and emulsion occur substantially without relative motion between the treating fluid and emulsion, or between the emulsion/treating fluid and the interior surface of the mold tube, meaning that the emulsion does not slide on the mold tube wall, the mold tube remains free and clear of emulsion residue, and product can be easily ejected from the mold tube 1 after thermal treatment.

According to the present invention, depositions of treating fluid and emulsion occur substantially without relative motion between the treating fluid and emulsion. This occurs as a result of both the structural details of the stuffing apparatus and deposition methods taught by the present invention. For example, the central emulsion passage 13 and treating fluid passage 14 are designed to provide careful regulation of emulsion and treating fluid flows, respectively, as described above. The stuffing methods as taught by the present invention involve regulation of one or more process variables, the variables including but not limited to: emulsion flow rate, treating fluid flow rate, stuffing tube retraction rate, and pressure in the mold tube at the output/discharge end 40 of the stuffing tube. Exemplary stuffing methods are discussed in greater detail below.

The stuffing tube 2 and mold tube 1 can be made of any suitable metal, preferably stainless steel. The mold tube wall preferably is constructed of a thin layer of conductive material so that the mold tube 1 can be heated rapidly to a predetermined treatment temperature and then cooled rapidly, if necessary, prior to ejection of the product. The jacket 11 also is made of a thin-walled conductive material. Accordingly, the total thermal mass of the jacket and mold tube is minimized, allowing the mold tube to be heated or cooled rapidly with a minimal flow of thermal fluid from the circulation system 12.

The mold tube preferably is sealed while a stuffing operation is taking place, thereby enabling proper control of stuffing tube motion and fluid flows during stuffing. If a good seal is maintained, stuffing tube motion is less sensitive to variations in fluid flow resistance, and positive pressure can be maintained in the molded emulsion product during stuffing of the mold tube. The stuffing tube sliding seal 15 can be any of a variety of seals that are pressure-activated and elastically pressed against the sealing surface, i.e. the mold tube wall. Examples of suitable materials for the sliding seal 15 include elastomeric o-rings and polymeric rings having generally c-shaped cross-sections with internal springs.

The output valve member 4 preferably is made of a soft but tough polymer or composite, for example an ultra-high molecular weight polyethylene. The output valve member 4 is designed to slide against the end of the metal mold tube. One preferred method of loading the valve member 4 in good sealing contact with the mold tube is to provide a backup valve support 23 to counterbalance the maximum expected pressure force in the mold tube 1. Fluid pressure can be supplied through an inlet 42 to a chamber 24 having a seal 25 enclosing an area on the opposite side of the valve member 4 from the stuffing tube. This fluid pressure can be released and the valve support 23 moved when product is to be ejected.

Figure 3:
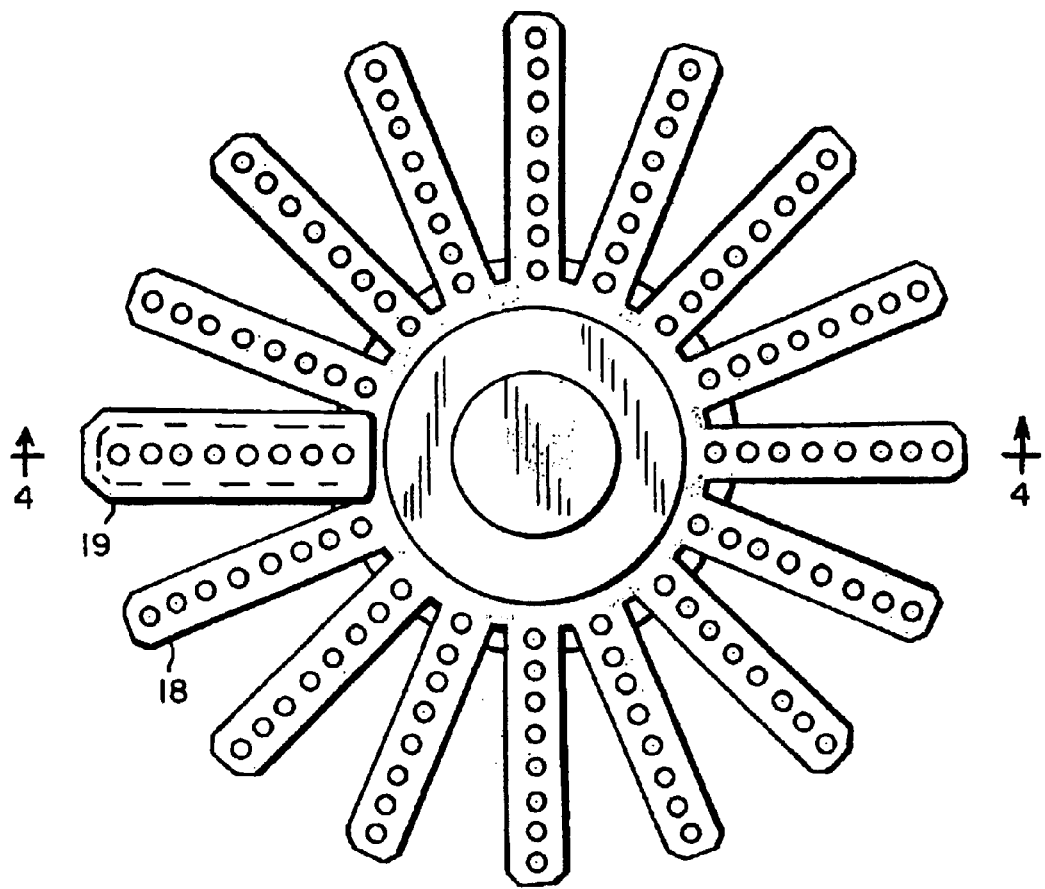
FIG. 3 is a plan view of a rotary stuffing machine including a stuffing tube array mounted over a rotary wheel of mold tube arrays.
Figure 4:
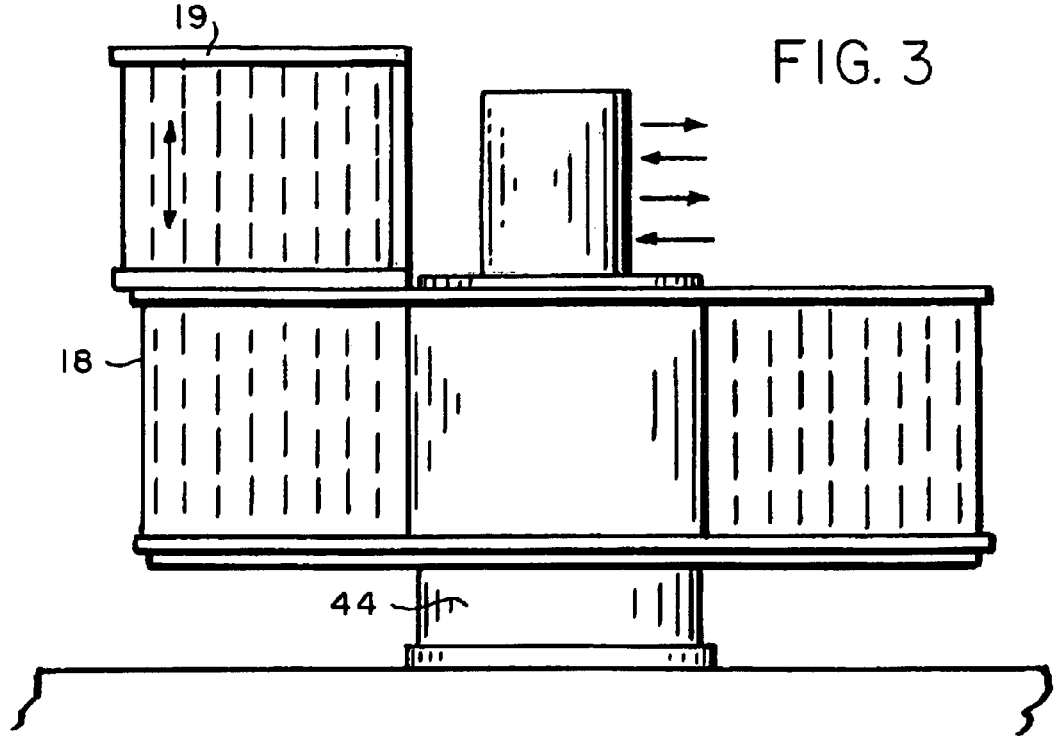
FIG. 4 is a cross-sectional side view of the rotary stuffing machine of FIG. 3.

FIGS. 3 & 4 illustrate an exemplary rotary production machine according to the present invention, in which a rotary wheel 18 supports mold tubes in a plurality of arrays, the mold tubes having their vertical axes extending radially outward from a central hub 44. A single array 19 of stuffing tubes preferably is supported over the rotary wheel 18 such that at certain indexed positions of the wheel, the stuffing tube array can be inserted into the mold tube array below it, and a complete stuffing operation can be carried out while the two tube arrays are index-locked together.

In one exemplary production arrangement, the stuffing tube array has fixed vertical axes, and the rotary wheel 18 is stopped and indexed via intermittent motion. Alternatively, the rotary wheel 18 can be rotated at a slow, but continuous speed, and the stuffing tube array is intermittently swung in an arc-like motion matching the motion of the mold tube array below. After one complete stuffing cycle, the stuffing tube array is rapidly swung back to its original index position. The above-described stuffing arrangements are well known in the field of automated production and packaging.

An exemplary method for forming casingless product from emulsion and treating fluid materials will now be discussed. To operate the emulsion supply system, the storage vessel 5 is filled with prepared emulsion and a lid is closed or the storage vessel is otherwise sealed, so that air pressure can be used to transfer the emulsion to the delivery vessel 6. Before delivery, the valve 8 between the storage vessel 5 and delivery vessel 6 is closed to establish a vacuum in the closed delivery vessel 6. After opening of this valve, emulsion can be transferred by air pressure from approximately the bottom of the storage vessel 5 to approximately the top of the delivery vessel 6. The flow rate of emulsion can be regulated by controlling the pressure differential between the vessels, entrained air being de-entrained and evacuated upon arrival in the delivery vessel 6.

Preferably a vacuum can be created in a known manner for delivery of emulsion into the delivery vessel in order to spread the emulsion into one or more thinner streams according to various known techniques. The vacuum is then released and air pressure is applied to the top of the delivery vessel 6, causing the emulsion to settle as a dense fluid mass on the bottom of the delivery vessel 6. Preferably the delivery vessel is then kept closed and the air pressure therein is regulated at a sufficient level to charge the inlet of the emulsion pump 7, so that the pump can be used to control the flow rate of emulsion through the stuffing tube 2, or alternatively, to regulate the pressure in the stuffing tube independent of the pressure of emulsion in the delivery vessel 6.

The stuffing tube is slideably and accurately positioned within a guide block 20 that is preferably co-axial with the stuffing tube 2 and mold tube 1. A conventional drive (not shown), such as an electrically driven screw and follower, is provided in order to translate the stuffing tube according to a predetermined schedule of motion, including but not limited to position, velocity, and motion sequences of the stuffing tube 2 and/or stuffing tube array 19 relative to the mold tube 1 and/or the rotary wheel 18, respectively.

In an exemplary stuffing method, initially the stuffing tube 2 is parked in a retracted position away from the mold tube, the mold tube entrance being blocked by the input valve member 3, whereupon the mold tube is rotated to a position in line with the stuffing tube axis. The output valve member 4 of the mold tube is held open, venting the mold tube. To start a stuffing sequence, the stuffing tube is inserted into the mold tube, forcing air ahead of the stuffing tube to escape through the output valve member 4. When the stuffing tube 2 is fully inserted in the mold tube 1, the valve 4 is closed. Preferably a small amount of treating fluid is pumped into the mold tube 1, wetting the inner surface 22 of the mold tube. Next, the stuffing tube 2 commences moving out of the mold tube while, at approximately the same time, the treating fluid and emulsion are permitted to flow.

In the exemplary stuffing method, there can be at least four control variables that are interrelated: emulsion flow rate, treating fluid flow rate, stuffing tube retraction rate, and pressure in the mold tube at the output/discharge end 40 of the stuffing tube. Only three of these variables can be actively controlled, with the fourth variable being a function of the other three variables and dependent on well known hydraulic relationships. The particular production machine configuration or machine design, as discussed herein, can influence the relationship between these variables.

In an exemplary stuffing method, preferably the treating fluid flow rate and the stuffing tube retraction rate are linked together in a constant ratio, so that a constant, thin layer of treating fluid is laid onto the mold tube wall as the stuffing tube 2 is retracted from the mold tube 1. By lining the mold tube with a layer of treating fluid at a rate fixed to the stuffing tube retraction rate, there is provided a constant separation between the emulsion and mold tube wall, thereby preventing unwanted adhesion and generally ensuring a consistent coagulation treatment at the surface layer or zone of the molded emulsion. Accordingly, product quality and desired characteristics of color, texture, and taste can be enhanced. Coagulation of the molded product is consistent because the flows of emulsion and treating fluid are approximately equal to the displaced volume rate in the mold tube caused by retraction of the stuffing tube. Where the treating fluid flow rate and stuffing tube retraction rate are not provided in a constant ratio, the result can be either a severe increase in pressure caused by too much emulsion flow for a given retraction rate, or alternatively, cavitation/ventilation in the emulsion caused by too little flow for a given retraction rate. Therefore, in the presently described method, since the stuffing tube retraction rate and treating fluid are provided in a constant ratio, the ratio of treating fluid flow to emulsion flow is also fixed, and coagulation is generally consistent in the molded product.

According to another exemplary stuffing method, flow rates for the emulsion and treating fluid are fixed, and the stuffing tube is permitted to move relatively freely during retraction. Pressure in the mold tube forces the stuffing tube to retract against only moderate resistant forces such as gravity and frictional drag between the stuffing and mold tubes. Such a method can be implemented where stuffing and mold tubes are in a vertical orientation, e.g., with the stuffing tube fixed below the mold tube and the mold tube free to move vertically when displaced by fluid flow. Internal pressure is generally minimal, at only a few pounds per square inch (psi), typically due to the weight of the mold tube and drag forces caused by the sliding seal 15 contacting the mold tube. The above-described arrangement is particularly useful in conjunction with mold tubes manually cycled with a single stuffing tube.

In a further exemplary stuffing method, a stuffing tube retraction rate within the mold tube is set, the flow rate of treating fluid is fixed to the retraction rate, and pressure in the mold tube is controlled by modulating the flow of emulsion. Such method can be implemented with a single set of stuffing and mold tubes operated automatically or remotely, and provided in any orientation of the mold axis that allows suitable ejection of the molded product. Preferably, the mold tube is fixed to a mounting structure, and the stuffing tube is slideably mounted and positively driven. Modulation of the emulsion flow can be accomplished by either bypassing the emulsion pump 7 with the valve 8 and pressurizing the delivery vessel 6, or by monitoring the pressure downstream of the pump 7 and controlling pump speed or drive impetus (e.g., torque) to maintain pressure in an acceptable range. The pressure control need not be precise, only sufficient to maintain positive pressure above the vapor partial pressure of the emulsion product in the mold tube, and preferably not exceeding the capacity of the stuffing tube to dispense sealing fluid or the functioning capability of the sliding seal 15. In the present method, constant set points are provided for pumping of the emulsion and treating fluid and control of the stuffing tube retraction, thereby permitting the emulsion pressure to remain within an acceptable range.

In accordance with the above methods, after stuffing occurs, thermal treatment is required, generally by heating the molded emulsion product using the above-described heat treatment system. It is desirable to minimize thermal treatment time, but a lower thermal treatment time necessarily requires a higher operating temperature. The operating temperature cannot exceed the maximum mold tube wall temperature that is permissible without causing product degradation. This temperature reflects the molding recipe and the molding pressure that inhibits boiling of hydrous emulsion, but preferably the wall temperature is below about 100 degrees C., and treatment time is approximately two to three minutes, more preferably about 2½ minutes.

Mold tube stuffing time is generally determined by the length of mold tube, and hence stuffing tube, and the velocity that emulsion can be pumped through the stuffing tube without causing degradation of the emulsion consistency or requiring impractical pumping pressure or control. Time for insertion of the stuffing tube into the mold tube is limited only by machine design considerations. The lengths of the stuffing and mold tubes in a retracted position are limited only by machine design and installation practicalities (e.g. room size). Mold tube and stuffing tube lengths can be approximately 2 to 12 feet, although shorter or longer lengths are within the scope of the present invention.

For high production stuffing operations using multiple stuffing tubes and mold tubes, it is desirable to provide an arrangement such as that disclosed in FIGS. 3 and 4, discussed earlier. By using the machine of FIGS. 3 and 4, mold tubes can be filled with coagulated and congealed product suitable for further packaging, such as canning. Preferably a few stuffing tube stations are operated at a high cyclic rate to fill many mold tubes progressing in sequence, as stuffing of the mold tubes can take much less time than satisfactory thermal treatment of the molded emulsion product. Accordingly, the number of mold tubes required for each stuffing tube is roughly equal to the ratio of treatment time to mold stuffing time, not including other dwell times in the machine.

Each array of mold tubes must be cycled, in turn, through thermal treatment and then discharge of product. According to an exemplary method, the following steps can be carried out: closing a valve on the input end of each mold tube in the array, heating the mold tube for a sufficient time corresponding to an arc of motion for the rotary wheel 18, cooling the mold tube to help strengthen the product and release it from the mold, opening the output plate 4 on the discharge end of the mold tube, and pressurizing the opposite end of the mold tube with air in order to ensure rapid ejection of product. However, under certain operating conditions and with particular types of emulsion product, it is not necessary to seal the mold tube under pressure, because the emulsion does not swell considerably during thermal treatment, and pressure is not needed for ejection, as the weight of the product is enough for the product to slide and fall from the tube.

Thermal treatment can be effected by jacketing the mold tubes in each array of the rotary wheel, and by valving each array to sources of hot and cold fluid flow. Various types of valves are well known in the packaging art, and different types of valves can be used to accomplish the same purpose. One exemplary method is to provide a three-way valve (not shown) for input of hot or cold fluid (e.g., water) to each tube array, and another valve similarly for discharge. All three-way valves are connected to hot and cold flow manifolds that are attached to the rotary wheel, and these manifolds are connected to stationary flow systems by way of a rotary fluid coupling having four passages (i.e., hot in and out, cold in and out). Three-way valves are well known, as are rotary fluid couplings. Four-way couplings could also be used in conjunction with five common rotary seal members. With this equipment, the three-way valves on each array are actuated at appropriate times as the array proceeds around during each rotation of the rotary wheel.

Another method for switching hot and cold treating fluid flow into and out of the mold tube arrays during chosen rotations of the rotary wheel is to provide stationary circumferential porting (not shown) in the hub of the wheel that mates with an input passage and output passage for each mold tube array as it is rotated through a particular port sector. This offers the advantages of simple flow passages and inherently timed flow switching, but it requires more complex sealing around the port perimeters, compared to more usual rotary fluid couplings that connect flow passages at all rotational positions.

In addition to sequencing the stuffing tube insertions and retractions, and sequencing the heat treatment, also valves on one or both ends of the mold tube must be sequenced to first contain the emulsion and then release the product. In the example shown in FIGS. 3 and 4, the lighter stuffing tube array 19 is positioned over the heavier rotary wheel 18 of mold tube arrays, so that with a relatively small space below the wheel, the product can slide out from the mold tubes, because typically the molded emulsion product (e.g. sausages) are quite flexible. Bottom closure for the mold tubes could include a non-rotating plate (not shown) pressed against the face plane of the tube ends everywhere except at the discharge sector, where the plate would be open, or missing, to let the product fall. If friction or emulsion smearing on this monolithic valve plate is not acceptable, then another design approach would be to attach an array of valve members, or a single valve plate to each radial array of mold tubes. These valve arrays could then be switched open at the appropriate sector of wheel rotation but be closed for the rest of their circumferential movement. The general valve design could be one of several types: ball, slide, or swing gate.

In conjunction with the above-described rotary wheel 18 and mold tube arrays, if molded emulsion pressure containment is required, a fixed, non-rotating cover plate (not shown) mounted in sliding contact with the top of the mold tube arrays could be used as a design alternative. If the mold tube wheel is indexed, the stuffing tube array can be mounted on the fixed cover plate. If the wheel is constantly rotated and the stuffing tube array is indexed, then either the cover plate is indexed with the stuffing tube array or a sector of the cover plate is absent, within which the indexing can take place. Alternatively an array of valves could be mounted on top of each mold tube array if the mold tube and stuffing tube arrays are designed to provide clear passage over the valve array when moving between indexed positions.

Although exemplary embodiments of the invention have been described using specific terms, such description is for illustrative purposes only, and it is to be understood that changes and variations may be made without departing from the spirit or scope of the following claims.

What is claimed is:

1. An apparatus for forming a proteinaceous emulsion into shaped food products, comprising:

a stuffing tube having a first end connected to an emulsion source and a second end for discharging the emulsion;

a treating fluid passage having a first end connected to a treating fluid source and a second end for discharging treating fluid; and a mold tube for receiving the stuffing tube, the stuffing tube being slideable axially along the mold tube, wherein the emulsion and treating fluid are discharged into the mold tube from the second end of the stuffing tube and the second end of the treating fluid passage, respectively.

2. The apparatus of claim 1, wherein the stuffing tube includes a central emulsion passage for receiving the emulsion from the emulsion source discharging the emulsion through the second end of the stuffing tube.

3. The apparatus of claim 2, wherein the treating fluid passage is arranged parallel to the central emulsion passage, such that the stuffing tube controllably discharges the emulsion as the treating fluid passage discharges the treating fluid.

4. The apparatus of claim 2, wherein the treating fluid passage is arranged parallel to the central emulsion passage, such that the stuffing tube controllably discharges the emulsion substantially without motion relative to the treating fluid discharged by the treating fluid passage.

5. The apparatus of claim 2, wherein the treating fluid passage includes a circumferential groove for distributing the treating fluid circumferentially about the emulsion discharged through the central emulsion passage.

6. The apparatus of claim 1, wherein the stuffing tube includes a wall extending between the first end and the second end of the stuffing tube.

7. The apparatus of claim 6, wherein the wall defines an emulsion passage through the stuffing tube.

8. The apparatus of claim 7, wherein the treating fluid passage comprises a conduit positioned within the wall of the stuffing tube generally parallel to the emulsion passage.

9. The apparatus of claim 8, wherein the treating fluid passage includes a circumferential groove for distributing the treating fluid into the mold tube.

10. The apparatus of claim 7, wherein the treating fluid passage is positioned within the wall of the stuffing tube.

11. The apparatus of claim 1, and further including a sliding seal positioned around a periphery of the stuffing tube.

12. The apparatus of claim 11, wherein the sliding seal is an elastomer or a polymer.

13. The apparatus of claim 1, wherein the mold tube includes an output end having a valve member rotatable between an open position and a closed position.

14. The apparatus of claim 13, wherein in the open position the valve member permits the food product to exit the mold tube, and in the closed position the valve member blocks the output end of the mold tube.

15. The apparatus of claim 13, wherein the valve member forms a seal with the mold tube.

16. The apparatus of claim 13, wherein the valve member is made of a polymer.

17. The apparatus of claim 13, and further including a valve support to counterbalance a pressure force in the mold tube.

18. The apparatus of claim 17, and further including a chamber within the valve support for receiving fluid to pressurize the valve support.

19. The apparatus of claim 1, and further including an emulsion pump for pumping the emulsion from a delivery vessel to the stuffing tube.

20. The apparatus of claim 1, and further including a treating fluid pump for pumping the treating fluid into the treating fluid passage.

21. The apparatus of claim 1, and further including a jacket surrounding the mold tube for circulating hot or cold fluid.

22. The apparatus of claim 1, wherein the stuffing tube and the mold tube are made of stainless steel.

23. The apparatus of claim 1, and further including a production machine having the stuffing tube among an array of stuffing tubes and the mold tube among an array of mold tubes.

24. The apparatus of claim 23, wherein the production machine includes additional arrays of mold tubes positioned in rows on a rotary wheel.

25. An apparatus for forming a proteinaceous emulsion into shaped food products, comprising:

a stuffing tube extending between an input end and a discharge end, the stuffing tube having a wall defining an emulsion passage;

a treating fluid passage positioned within the wall of the stuffing tube and radially outside of the emulsion passage; and a mold tube for receiving the stuffing tube, the stuffing tube being slideable axially along the mold tube, wherein emulsion and treating fluid are deposited from the discharge end of the stuffing tube into the mold tube.

26. The apparatus of claim 25, wherein the treating fluid passage is arranged parallel to the emulsion passage, such that the stuffing tube controllably discharges the emulsion as the treating fluid passage discharges the treating fluid.

27. The apparatus of claim 25, wherein the treating fluid passage is arranged parallel to the emulsion passage, such that the stuffing tube controllably discharges the emulsion substantially without motion relative to the treating fluid discharged by the treating fluid passage.

28. The apparatus of claim 25, wherein the treating fluid passage includes a circumferential groove for distributing the treating fluid circumferentially about the emulsion discharged through the emulsion passage.

29. The apparatus of claim 25, and further including a sliding seal positioned around a periphery of the stuffing tube.

30. The apparatus of claim 25, wherein the mold tube includes an output end having a valve member rotatable between an open position and a closed position.

31. The apparatus of claim 30, wherein in the open position the valve member permits the food product to exit the mold tube, and the closed position the valve member blocks the output end of the mold tube.

32. The apparatus of claim 31, and farther including a valve support to counterbalance a pressure force in the mold tube.

33. The apparatus of claim 32, and further including a chamber within the valve support for receiving fluid to pressurize the valve support.

34. The apparatus of claim 25, wherein the treating fluid passage comprises a conduit positioned within the wall of the stuffing tube generally parallel to the emulsion passage.

35. The apparatus of claim 34, wherein the treating fluid passage includes a circumferential groove for distributing the treating fluid into the mold tube.

36. The apparatus of claim 25, and further including an emulsion pump for pumping the emulsion from a delivery vessel to the stuffing tube.

37. The apparatus of claim 25, and further including a treating fluid pump for pumping the treating fluid into the treating fluid passage.

38. The apparatus of claim 25, and further including a production machine having the stuffing tube among an array of stuffing tubes and the mold tube among an array of mold tubes.

39. The apparatus of claim 38, wherein the production machine includes additional arrays of mold tubes positioned in rows on a rotary wheel.

40. A method for forming a proteinaceous emulsion into shaped food products, the emulsion and treating fluid being received in a stuffing tube, comprising the steps of:
   inserting the stuffing tube into a mold tube, the stuffing tube being slideable along the mold tube;
   retracting the stuffing tube from the mold tube while discharging the emulsion into the mold tube; and
   discharging the treating fluid from a treating fluid passage into the mold tube.

41. The method of claim 40, wherein the discharging steps occur substantially without relative motion between the emulsion and the treating fluid.

42. The method of claim 40, wherein the step of discharging the emulsion occurs substantially without relative motion between the emulsion and the mold tube.

43. The method of claim 40, wherein the emulsion and treating fluid are discharged in an approximately constant ratio.

44. The apparatus of claim 40, wherein the treating fluid is discharged such that it evenly coats the inside of the mold tuba.

45. The apparatus of claim 40, wherein the treating fluid is discharged so as to continuously wet the inside of the mold tube.

46. The method of claim 40, wherein flow rates for the emulsion and the treating fluid are controlled.

47. The method of claim 46, wherein the emulsion flow rate and the treating fluid flow rate are fixed.

48. The method of claim 40, wherein the rate of retracting the stuffing tube is controlled.

49. The method of claim 40, wherein the rate of retracting the stuffing tube and the treating fluid flow rate are linked in a constant ratio.

50. The method of claim 40, further including a step of heat treating the emulsion and the treating fluid in the mold tube.

51. The method of claim 40, further including steps of:
   providing a rotary wheel having a plurality of arrays of mold tubes;
   providing an array of stuffing tubes; and
   indexing the array of stuffing tubes with each array of mold tubes.

52. The method of claim 40, further comprising a step of pumping the emulsion from a delivery vessel to the stuffing tube prior to discharging the emulsion.

53. The method of claim 40, further comprising a step of pumping the treating fluid into the stuffing tube prior to discharging the treating fluid.

54. A method for forming proteinaceous emulsion into shaped food products, where the emulsion and treating fluid are received in a stuffing tube, the stuffing tube having a wall defining a central emulsion passage, and a treating fluid passage positioned within the wall and radially outside of the central emulsion passage, comprising the steps of:
   inserting the stuffing tube into a mold tube, the stuffing tube being slideable along the mold tube; and
   retracting the stuffing tube from the mold tube while discharging the emulsion into the mold tube; and
   discharging the treating fluid from the treating fluid passage into the mold tube, wherein the discharging steps occur substantially without relative motion between the emulsion and the treating fluid.

55. The method of claim 54, wherein the emulsion and treating fluid are discharged in an approximately constant ratio.

56. The apparatus of claim 54, wherein the treating fluid is discharged such that it evenly coats the inside of the mold tube.

57. The apparatus of claim 54, wherein the treating fluid is discharged so as to continuously wet the inside of the mold tube.

* * * * *